United States Patent
Futatsuhashi

(10) Patent No.: US 7,168,757 B2
(45) Date of Patent: Jan. 30, 2007

(54) SIDE SILL GARNISH HAVING SOUND ABSORBING MEMBER WHICH INCLUDES OUTER PERIPHERAL RIGID PORTIONS

(75) Inventor: Akira Futatsuhashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/207,384

(22) Filed: Aug. 19, 2005

(65) Prior Publication Data

US 2006/0066139 A1    Mar. 30, 2006

(30) Foreign Application Priority Data

Sep. 28, 2004    (JP)    ............... 2004-282350

(51) Int. Cl.
*B60R 27/00*    (2006.01)
(52) U.S. Cl. ............. 296/209; 296/193.05; 296/203.03
(58) Field of Classification Search ........... 296/203.03, 296/209, 193.05
See application file for complete search history.

(56) References Cited

U.S. PATENT DOCUMENTS

| | | | | |
|---|---|---|---|---|
| 2,212,551 A | * | 8/1940 | Reid | ............................ 296/209 |
| 5,288,121 A | * | 2/1994 | Graves | ........................ 296/209 |
| 2004/0084820 A1 | * | 5/2004 | Kato et al. | ................... 267/141 |
| 2005/0218700 A1 | * | 10/2005 | Yamamoto et al. | ......... 296/209 |

FOREIGN PATENT DOCUMENTS

JP    2004-168134    6/2004

* cited by examiner

*Primary Examiner*—Lori L. Coletta
(74) *Attorney, Agent, or Firm*—Rankin, Hill, Porter & Clark LLP

(57) ABSTRACT

A side sill garnish at the outside of a side sill of a vehicle has a garnish main body as an outer surface of the side sill garnish; and a sound absorbing member provided on the inside of the garnish main body, and has a rigid member at an outer periphery of the sound absorbing member. The rigid member is attached to the garnish main body. Preferably, the sound absorbing member is made of a foam material, and the rigid member is formed by compressing the foam material. For example, the sound absorbing member, made of a foam material, has portions for fastening the sound absorbing member to the main body using clips; and these portions are formed by compressing the foam material. In another example, the sound absorbing member has rigid members on opposite sides in the outer periphery, and the rigid members are attached to the main body.

13 Claims, 3 Drawing Sheets

SIDE SILL GARNISH HAVING SOUND ABSORBING MEMBER WHICH INCLUDES OUTER PERIPHERAL RIGID PORTIONS

BACKGROUND OF THE INVENTION

1. Field of the Invention

The present invention relates to a side sill garnish used in a vehicle such as an automobile.

Priority is claimed on Japanese Patent Application No. 2004-282350, filed Sep. 28, 2004, the content of which is incorporated herein by reference.

2. Description of Related Art

Generally, a side sill garnish provided in a vehicle such as an automobile employs a structure having a door seal for preventing water, dust, and external sound from entering the vehicle. In particular, in order to block external sound which can enter through a minute gap or hole, various methods have been proposed. For example, a side sill garnish provided at the outside of the side sill is effectively used by attaching a sound absorbing member to an inner face of the side sill garnish (see Japanese Unexamined Patent Application, First Publication No. 2004-168134).

In the above conventional technique, sound absorbing performance can be improved by increasing the volume of the sound absorbing member. However, in this case, rigidity of the side sill garnish may be insufficient. In addition, brackets or the like are necessary for attaching the sound absorbing member to the side sill garnish; thus, the number of parts and the weight of the vehicle are increased.

SUMMARY OF THE INVENTION

In light of the above circumstances, an object of the present invention is to provide a side sill garnish for securing necessary rigidity while decreasing the number of parts, improving efficiency in work for attaching a sound absorbing member, and reducing the weight of the vehicle as much as possible.

Therefore, the present invention provides a side sill garnish (e.g., a side sill garnish 5 in an embodiment explained later) provided at the outside of a side sill section (e.g., a side sill section 3 in the embodiment) of a vehicle, comprising:

a garnish main body (e.g., a garnish main body 20 in the embodiment) functioning as an outer surface of the side sill garnish; and a sound absorbing member (e.g., a sound absorbing member 50 in the embodiment) which is provided on the inside of the garnish main body, and has a rigid member (e.g., rigid portions 50 in the embodiment) at an outer periphery of the sound absorbing member, wherein the rigid member is attached to the garnish main body.

Accordingly, due to the rigid member, considerable rigidity can be provided to the sound absorbing member. In addition, due to the rigid member at the outer periphery of the sound absorbing member, it is possible to prevent water, dust, and external sound from entering the vehicle. Therefore, the volume of the sound absorbing member can be increased, thereby improving the sound absorbing performance. Simultaneously, rigidity can be improved, and an increase in the weight of the vehicle can be reduced as much as possible.

Preferably, the sound absorbing member is made of a foam material, and the rigid member is formed by compressing the foam material. Accordingly, the rigidity of the sound absorbing member can be improved without using other parts, and an increase in the weight of the vehicle can be reduced as much as possible. Therefore, ease of attachment work can be improved.

Accordingly, the clip attachment portions for fastening the sound absorbing member to the garnish main body can be provided without using other parts; thus, the volume of the sound absorbing member can be maximized, and ease of attachment work can be improved. In addition, the clip attachment portions can be designed in consideration of expansion and contraction relating to thermal expansion, so as to strengthen the clip attachment portions. Furthermore, portions (of the sound absorbing member) except for the clip attachment portions can be effectively used as the sound absorbing member, thereby improving the sound absorbing performance.

In a typical example, the sound absorbing member has rigid members on opposite sides in the outer periphery, and the rigid members are attached to the garnish main body. In this case, preferably, the sound absorbing member is made of a foam material, and each rigid member is formed by compressing the foam material.

DETAILED DESCRIPTION OF THE INVENTION

Hereinafter, embodiments according to the present invention will be described with reference to the appended figures.

Figure 1:
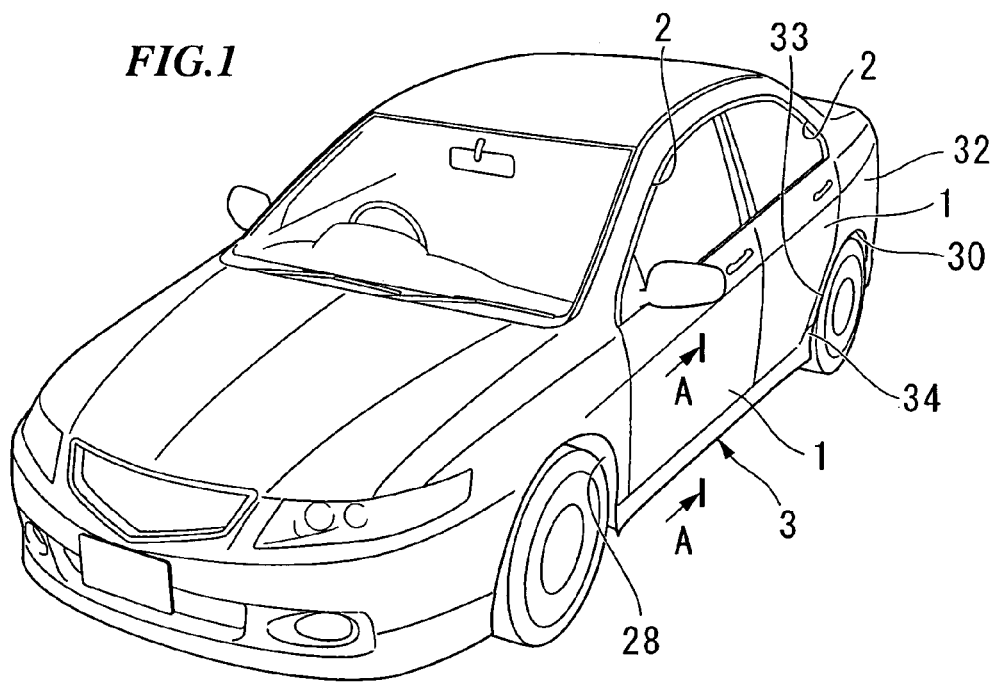
FIG. 1 is a perspective view showing a vehicle having a side sill garnish as an embodiment of the present invention.

FIG. 1 is a perspective view showing a vehicle having a side sill garnish as an embodiment of the present invention. As shown in FIG. 1, the vehicle has a side door 1, an opening 2 to which the side door 1 is attached, and a side sill section 3 under the opening 2.

Figure 2:
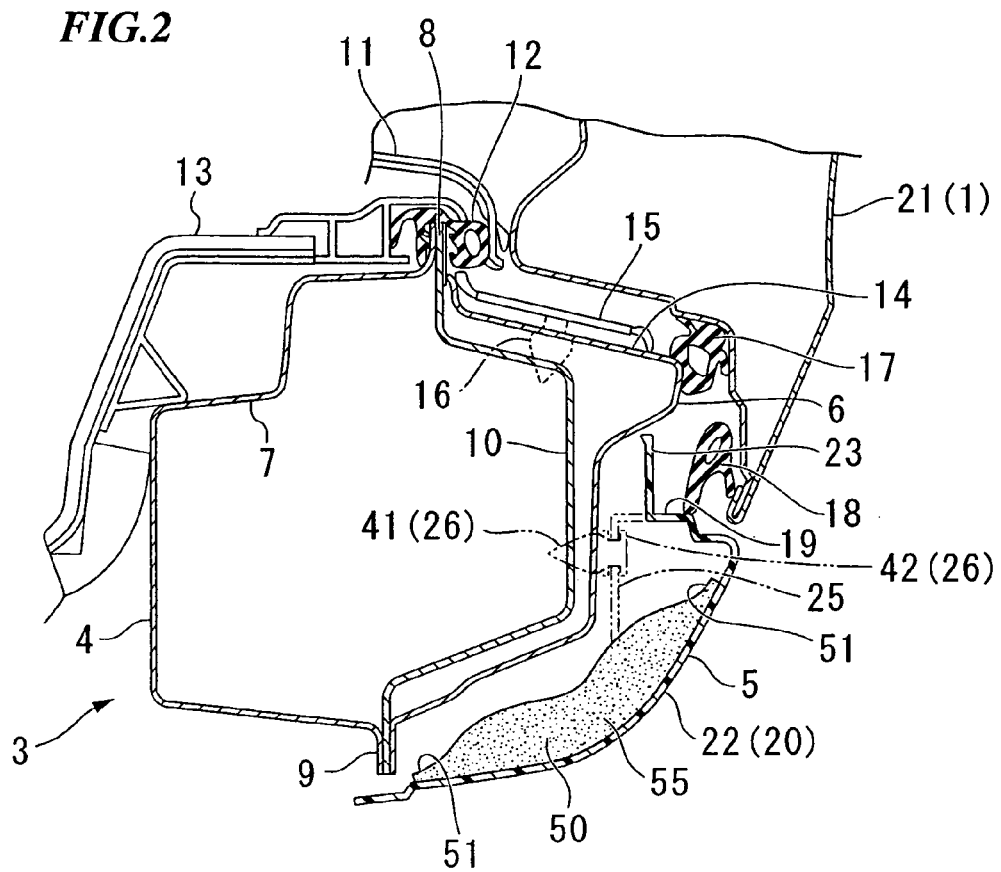
FIG. 2 is a sectional view along line A—A in FIG. 1.

FIG. 2 is a sectional view along line A—A in FIG. 1. As shown in FIG. 2, the side sill section 3 basically consists of a side sill 4 and a side sill garnish 5 which is attached to the outside of the side sill 4 and functions as an outer surface of the side sill section 3.

The side sill 4 is a frame member of the vehicle body and has a closed-section structure consisting of an outer sill panel 6 provided at the exterior of the vehicle, and an inner sill panel 7 provided in the interior of the vehicle. Between the outer sill panel 6 and the inner sill panel 7, a stiffener 10 is provided, which is supported at upper and lower joint flange portions 8 and 9, respectively.

At the upper joint flange portion 8 of the side sill 4, a vehicle body seal 12 is provided, which is in tight (or close) contact with an interior material 11 of the side door 1 when the side door 1 is closed. The upper joint flange portion 8 of the side sill 4, which includes a base portion of the vehicle body seal 12, is covered with a lining 13 extending toward the floor.

To an upper wall 14 of the outer sill panel 6, a step garnish 15 is attached using a clip 16. Close to the lower side of the step garnish 15, a first door seal 17 and a second door seal 18 are provided, which are attached to a lower inner wall of the side door 1. The first door seal 17 can make tight contact with the outer sill panel 6, and the second door seal 18 can make tight contact with an upper wall 19 of the side sill garnish which is attached at the outside of the outer sill panel 6.

The side sill garnish is made of resin, and consists of a garnish main body 20 and a sound absorbing member 50 provided at the inside of the garnish main body 20.

The garnish main body 20 has an outer wall 22 which bends in such a manner as to be continuous with a door skin 21 which functions as an outer panel of the side door 1. On the upper portion of the outer wall 22, a shield wall 23 is disposed at the inside of the second door seal 18 and is provided for preventing water or the like from entering the vehicle. The lower edge of the outer wall 22 extends to the vicinity of the lower joint flange portion 9 of the side sill 4. The lower edge of the garnish main body 20 has attachment portions 24 which are attached to the inner sill panel 7 (see FIG. 3, which is a perspective view of the side sill garnish 5).

In the outer wall 22, attachment portions 25 are formed at regular intervals and are positioned on the side of the outer wall 22 toward the interior of the vehicle. Due to clips 26 provided at the attachment portions 25, the garnish main body 20 is fastened to the outer sill panel 6 and the stiffener 10 of the side sill 4.

Figure 3:
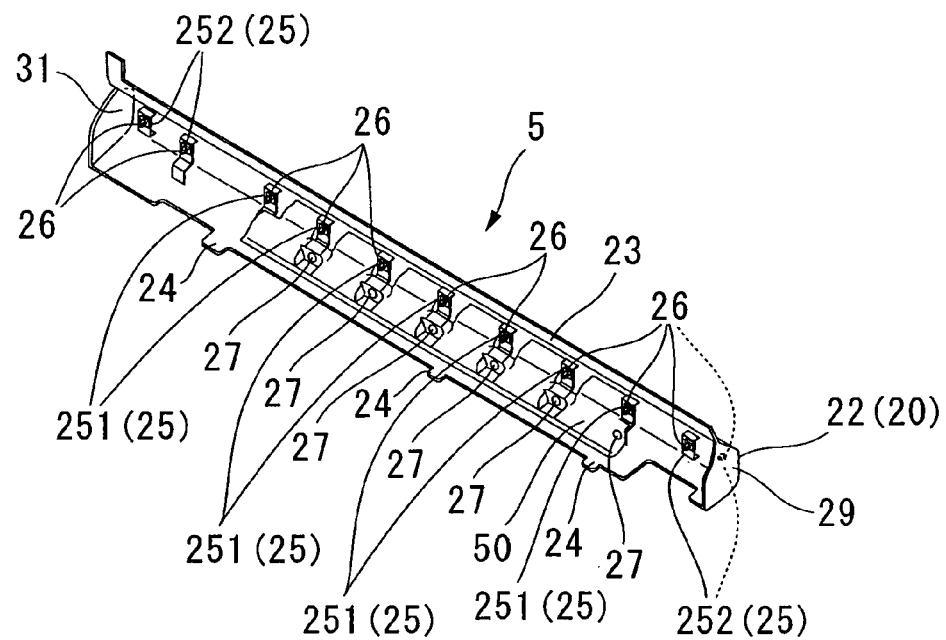
FIG. 3 is a perspective view of the side sill garnish in the embodiment.

As shown in FIG. 3, the attachment portions 25 are classified into (i) attachment portions 251 which also function as attachment portions for fastening the sound absorbing member 50 (explained later), and (ii) ordinary attachment portions 252 which do not function as attachment portions for fastening the sound absorbing member 50. In the present embodiment, two ordinary attachment portions 252 are provided at each of the front and rear ends of the garnish main body 20 (i.e., a total of four attachment portions 252), and seven attachment portions 251 are provided in the middle of the length (i.e., in the front-rear direction) of the garnish main body 20.

The sound absorbing member 50 is arranged on the inside of the outer wall 22 of the garnish main body 20 and is attached to the attachment portions 251 of the garnish main body 20 using clips 27.

More specifically, the garnish main body 20 has (i) a front wall 29 at the front end, which faces an inner wall of a front wheel housing 28, and (ii) a rear wall 31 at the rear end, which faces an inner wall of a rear wheel housing 30 (see FIG. 1). The upper edge of a rear end of the garnish main body 20 protrudes upward and functions as a portion of a front side 34 of a wheel arch portion 33 of a rear fender 32.

Figure 4:
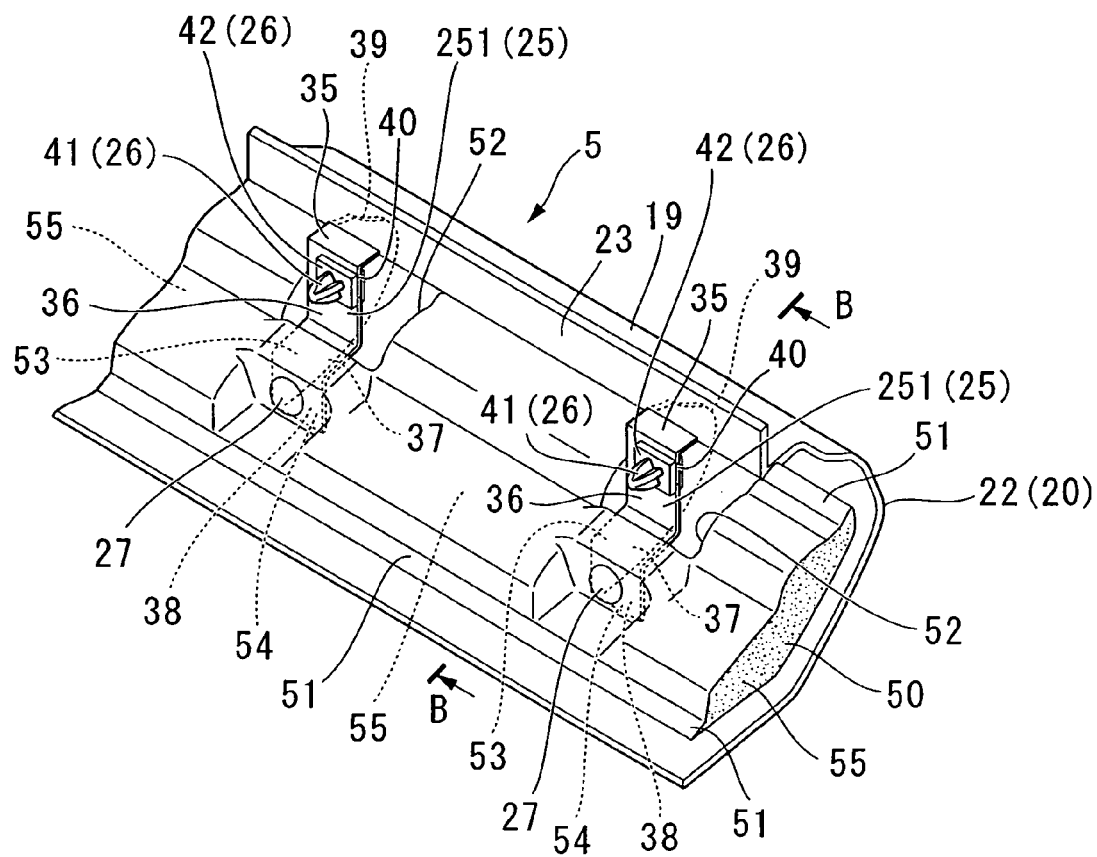
FIG. 4 is a partially enlarged view of FIG. 3.
Figure 5:
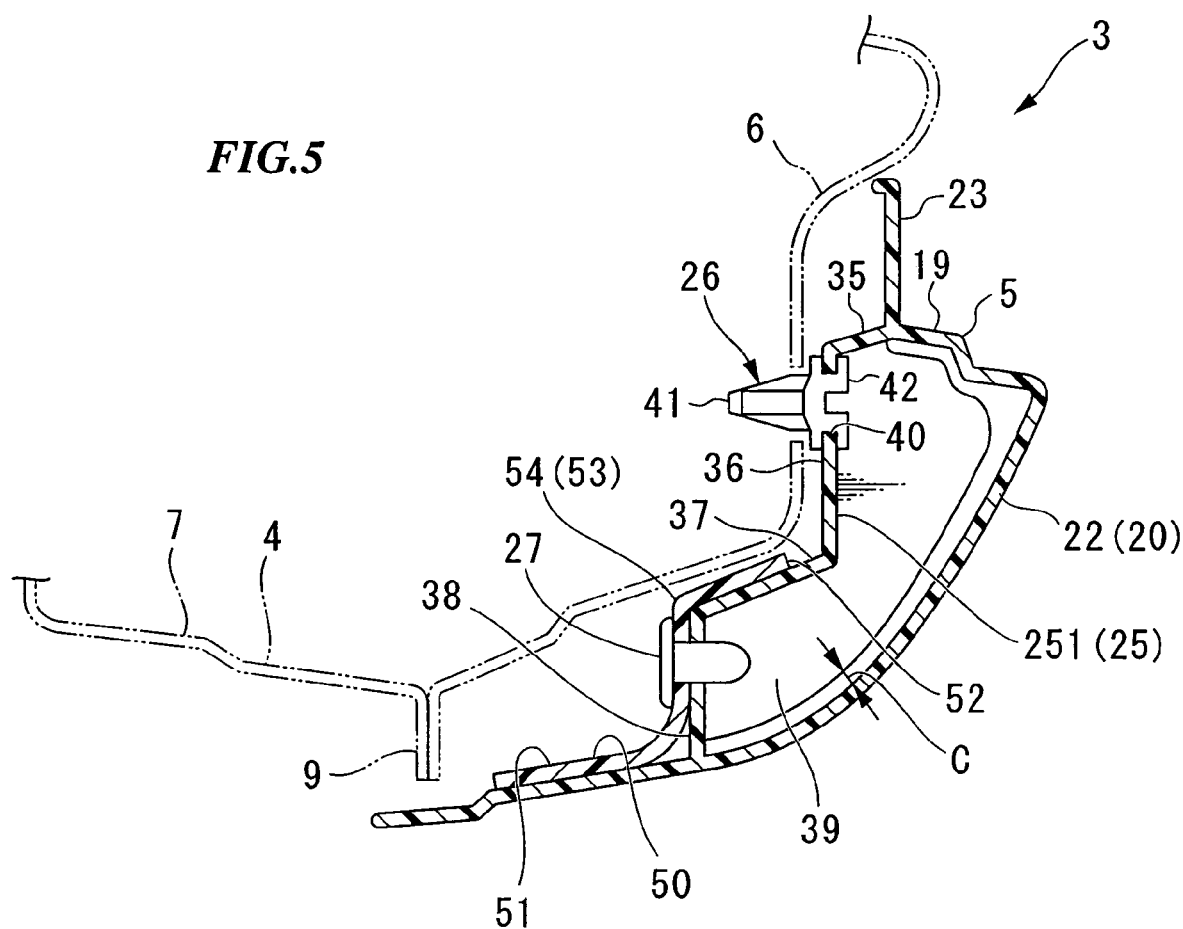
FIG. 5 is a sectional view along line B—B in FIG. 4.

FIG. 4 is a partially enlarged view of FIG. 3. FIG. 5 is a sectional view along line B—B in FIG. 4.

As shown in FIGS. 4 and 5, each attachment portion 251, which simultaneously functions as an attachment portion for the garnish main body 20 and an attachment portion for the sound absorbing member 50, includes (i) a horizontal portion 35 extending from the base portion of the shield wall 23 (provided at the back side of the outer wall 22) toward the interior of the vehicle, (ii) an attachment seating 36 extending downward from an end of the horizontal portion 35, (iii) a ledge portion 37 extending from the attachment seating 36 toward the interior of the vehicle, and (iv) a seating face 38 extending downward from the ledge portion 37. The lower edge of the seating face 38 is joined to the lower face of the outer wall 22. In addition, a plate portion 39 is formed along the rear edge of the attachment portion 251, and a clearance C (see FIG. 5) is provided between the plate portion 39 and the inner face of the outer wall 22. Due to the plate portion 39, required rigidity of the attachment portion 251 is obtained, and generation of pits or the like on the surface of the garnish main body 20 is prevented.

On the attachment seating 36 of each attachment portion 251, a notch portion 40 is formed, into which a clip 26 is inserted. In the notch portion 40, the side toward the front or the back is open, and a base portion 42 of the clip 26 is slidably inserted into the notch portion 40 while a fitting portion 41 of the clip 26 protrudes toward the interior of the vehicle. The garnish main body 20 is fastened to the outer sill panel 6 using the clips 26 attached to the attachment portions 251 as explained above, and also the clips 26 attached to the ordinary attachment portions 252. In addition, the stiffener 10 has holes for preventing contact between the heads of the clips 26 and the stiffener 10.

The sound absorbing member 50 is made of a foam material (typically, a foam resin). As shown in FIGS. 3 to 5, outer peripheries of the sound absorbing member 50 are compressed by thermal welding so as to produce thinner rigid portions 51 (i.e., rigid members) for improving rigidity. Instead of thermal welding, press molding may be performed for compressing the outer peripheries.

The sound absorbing member 50 has cut portions 52 for exposing the horizontal portions 35 and the attachment seatings 36 of the attachment portions 251 of the garnish main body 20 when the sound absorbing member 50 is attached to the garnish main body 20.

In addition, portions of the sound absorbing member 50 corresponding to the ledge portions 37 and the seating faces 38 of the attachment portions 251 are also compressed similar to the above-described outer peripheries of the sound absorbing member 50, so as to produce thinner rigid portions 53 (i.e., rigid members) for improving rigidity.

In each rigid portion 53, a portion corresponding to the seating face 38 functions as a clip attachment portion 54 (which is a rigid member), and a clip 27 is inserted into the clip attachment portion 54 toward the exterior of the vehicle. The sound absorbing member 50 is fastened to the garnish main body 20 by the clips 27. Therefore, in the sound absorbing member 50, a sound absorbing portion 55, which expands toward the inside of the outer wall 22 of the garnish main body 20, is formed in the areas except for the clip attachment portions 54, the ledge portions 37, the cut portions 52, and the rigid portions 51 at the outer peripheries. The clip attachment portion 54 is positioned in the vicinity of each cut portion 52, which is a portion of the outer periphery of the sound absorbing member 50, and thus the clip attachment portion 54 is also a portion of the outer periphery of the sound absorbing member 50.

According to the above embodiment, in the side sill garnish 5, the sound absorbing member 50 having the rigid portions 51 and 53 is provided on the inside of the garnish main body 20, thereby providing considerable rigidity to the sound absorbing member 50 itself. In addition, the rigid portions 51 are attached in such a manner as to make tight contact with the inner wall of the garnish main body 20. Therefore, the rigidity of the entire portion (i.e., the side sill garnish) can be improved, and it is possible to reliably prevent water, dust, and external sound from entering the vehicle from the rigid portions 51 making tight contact with the inner wall of the garnish main body 20. Accordingly, even when the volume of the sound absorbing member 50 is increased, the rigidity is not degraded, and thus the sound absorbing performance can be improved.

The sound absorbing member 50 is made of a foam resin material, and the rigid portions 51 and 53 are formed by compressing the foam resin material. Therefore, it is possible to improve the rigidity of the sound absorbing member 50 without using other parts. Accordingly, in comparison with a case using other parts for improving the rigidity, the number of parts can be reduced, ease of attachment work can be improved, and increase in the weight of the vehicle can be reduced as much as possible.

In particular, the clip attachment portions 54 for attaching the sound absorbing member 50 to the garnish main body 20 are formed by compressing the foam material; thus, no other parts are necessary, and performance of attachment work can be improved. In addition, the clip attachment portions 54 can be provided in the vicinity of the center line of the sound absorbing member 50 in the vertical direction, that is, in the vicinity of the center of gravity of the sound absorbing member 50, thereby minimizing the number of points at which the clips 27 are attached.

In addition, the side sill garnish 5 is a relatively long member, and a margin in consideration of expansion and contraction relating to thermal expansion must be secured. However, both the garnish main body 20 and the sound absorbing member 50 are made of resin. Therefore, even when an amount of expansion and contraction is different between the garnish main body 20 and the sound absorbing member 50, the difference is very small. Therefore, in comparison with a case of attaching both via another metal member, the strength of the attached portions between the garnish main body 20 and the sound absorbing member 50 can be improved.

Furthermore, in the notch portions 40 (formed in the garnish main body 20) for the clips 26, the side toward the front or the back is open (i.e., the notch portions 40 are formed in the length of the garnish main body 20); thus, expansion and contraction relating to thermal expansion of the garnish main body 20 with respect to the side sill 4 are permissible. In addition, the sound absorbing member 50 can have thick portions except for the clip attachment portions 54; thus, a higher sound absorbing performance can be obtained.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A side sill garnish provided at the outside of a side sill section of a vehicle, comprising:
    a garnish main body functioning as an outer surface of the side sill garnish; and
    a sound absorbing member made of a foam material, which is provided on the inside of the garnish main body, said sound absorbing member having a rigid member at an outer periphery of the sound absorbing member, wherein the rigid member is attached to the garnish main body.

2. The side sill garnish according to claim 1, wherein the rigid member is formed by compressing the foam material.

3. The side sill garnish according to claim 1, wherein:
    the sound absorbing member has clip attachment portions for fastening the sound absorbing member to the garnish main body using clips; and
    the clip attachment portions are formed by compressing the foam material.

4. The side sill garnish according to claim 1, wherein the sound absorbing member has rigid members on opposite sides in the outer periphery, and the rigid members are attached to the garnish main body.

5. The side sill garnish according to claim 4, wherein each rigid member is formed by compressing the foam material.

6. The side sill garnish according to claim 1, wherein said garnish main body includes an outer wall and an attachment portion, said attachment portion being integrally secured to the outer wall and extending toward the side sill, said attachment portion comprising:
    a first portion that receives a garnish mounting clip to secure the garnish main body to the side sill; and,
    a second portion that receives a sound absorbing member mounting clip to secure the sound absorbing member to the garnish main body attachment portion.

7. The side sill garnish according to claim 6, wherein a plate portion extends from the attachment portion toward an inner surface of the outer wall, said plate portion being spaced from the inner surface of the outer wall to define a clearance.

8. The side sill garnish according to claim 6, wherein the rigid member is formed by compressing the foam material.

9. The side sill garish according to claim 6, wherein:
    the sound absorbing member has a clip attachment portion for fastening the sound absorbing member to the attachment portion of the garnish main body via the sound absorbing member mounting clip; and
    the clip attachment portion is formed by compressing the foam material.

10. The side sill garnish according to claim 1, wherein said garnish main body has a length dimension and includes an outer wall and a plurality of attachment portions, said attachment portions, which are provided at spaced intervals along the length of the garnish main body, being integrally secured to the outer wall and extending toward the side sill, each of said attachment portions comprising:
    a first portion that receives a garnish mounting clip to secure the garnish main body to the side sill; and,
    a second portion that receives a sound absorbing member mounting clip to secure the sound absorbing member to the garnish main body attachment portion.

11. The side sill garnish according to claim 10, wherein each of the attachment portions includes a plate portion that extends from the first and second portions toward an inner surface of the outer wall, said plate portion being spaced from the inner surface of the outer wall to define a clearance.

12. The side sill garnish according to claim 10, wherein the rigid member is formed by compressing the foam material.

13. The side sill garnish according to claim 10, wherein:
    the sound absorbing member has a plurality of clip attachment portions for fastening the sound absorbing member to the attachment portions of the garnish main body via the sound absorbing member mounting clips; and
    the clip attachment portions are formed by compressing the foam material.

* * * * *